United States Patent [19]

Yamamoto

[11] Patent Number: 4,821,100
[45] Date of Patent: Apr. 11, 1989

[54] IMAGE SIGNAL COMPRESSOR

[75] Inventor: Isamu Yamamoto, Kanagawa, Japan

[73] Assignee: Sony Corporation, Tokyo, Japan

[21] Appl. No.: 763,416

[22] Filed: Aug. 7, 1985

[30] Foreign Application Priority Data

Aug. 10, 1984 [JP] Japan .................. 59-167604

[51] Int. Cl.⁴ .............................. H04N 5/14
[52] U.S. Cl. .................... 358/170; 358/27
[58] Field of Search ......... 358/170, 27, 32, 164, 358/168, 169, 174, 21 R

[56] References Cited

U.S. PATENT DOCUMENTS 3,542,944 11/1970 Peffer et al. ............... 358/164
3,684,825 8/1972 Dischert et al. .

FOREIGN PATENT DOCUMENTS 2459442 6/1976 Fed. Rep. of Germany .
2758758 8/1978 Fed. Rep. of Germany .
1345679 11/1963 France .
1108283 4/1968 United Kingdom ......... 358/164
2069796 8/1981 United Kingdom .

Primary Examiner—James J. Groody
Assistant Examiner—David E. Harvey
Attorney, Agent, or Firm—Hill, Van Santen, Steadman & Simpson

[57] ABSTRACT

An image signal compressor having a controller for adjusting the compression start potential in such a way as to decrease it with increasing highest peak voltage level of three chrominance signals to be compressed, in addition to three first resistors, three diodes and three second resistors. Therefore, even if one of three chrominance signals rises excessively high, it is possible to always compress the chrominance signals below a predetermined level without limitation by limiter circuits, thus preventing the chrominance signal having an excessively high peak voltage level from being regenerated in white on a cathode-ray tube. The signal compressor is applicable to a monochrome image pickup tube or solid-state image pickup elements as well as a color image pickup tube or color solid-state image pickup elements.

10 Claims, 2 Drawing Sheets

IMAGE SIGNAL COMPRESSOR

BACKGROUND OF THE INVENTION

1. Field of the Invention

The present invention relates generally to an image signal compressor for compressing the voltage level of an image signal in excess of a predetermined compression voltage level, and more particularly to a control circuit or a controller incorporated in the image signal compressor connected to an image pickup tube or solid-state image pickup elements.

2. Description of the Prior Art

The background of the present invention will be explained with respect to its application to an image signal compressor connected to an image pickup tube.

The image signal compressor is a kind of converter, through which the voltage level of a signal in excess of a predetermined level is reduced or compressed within a predetermined voltage range at signal transmission terminals.

In the compressor, a knee level is usually determined at which the voltage level of a signal begins to be compressed. Further, a limiter is additionally connected to the output terminal of the compressor for further securely limit the peak voltage level of the compressed signal.

In the case where the signal to be compressed varies in saw tooth waveform fashion for instance, the signal is derived from the compressor as it is without compression as far as the signal voltage level is below the knee level, but compressed by the compressor at a predetermined compression ratio when the signal voltage level is beyond the knee level. The voltage level of the compressed signal increases with increasing time elapsed until the original signal voltage level reaches its peak value. Therefore, if the peak voltage value of the signal to be compressed is constant, the peak value of the compressed signal may be constant without being further limited or clipped by the limiter. However, if the peak value of the signal to be compressed varies to still a higher value, there exists a problem in that the peak voltage value of the compressed signal may rise beyond the limiter level, so that the compressed signal may be clipped by the limiter without being compressed normally. This is because the knee level is fixedly predetermined in the compressor and thereby the image signal having a high peak voltage value is compressed beyond a predetermined limiter level.

The circuit configuration and its operation of an example of prior-art image signal compressors will be described in further detail hereinafter with reference to the attached drawings under DETAILED DESCRIPTION OF THE PREFERRED EMBODIMENT.

SUMMARY OF THE INVENTION

With these problems in mind, therefore, it is the primary object of the present invention to provide an image signal compressor through which an image (luminance) signal transduced by a monochrome image pickup tube or image (chrominance) signals transduced by a color image pickup tube can effectively and normally be compressed at a predetermined compression ratio, irrespective of the magnitude of the image signal voltage level, without being subjected to the limitation of a limiter and also without reducing the compression ratio.

To achieve the above-mentioned object, the image signal compressor according to the present invention comprises: (a) three first resistors, three chrominance signals to be compressed being applied to each one end thereof separately; (b) three diodes connected to each of said three first resistors separately, three compressed chrominance signals being derived from each junction point between said first resistor and said diode; (c) three second resistors connected in series with each of said three diodes separately; and (d) control means responsive to each of the three chrominance signals to be compressed and connected to said three second resistors for controlling each compression start potential at which said three diodes are allowed to be conductive in such a way as to decrease the compression start potential with increasing highest peak voltage level of the three chrominance signals to be compressed or increase the compression start potential with decreasing highest peak voltage level of the three chrominance signals to be compressed, when said three diodes are conductive, the three chrominance signals being compressed at each compression ratio determined by each of said three first resistors and each of said three second resistors.

BRIEF DESCRIPTION OF THE DRAWINGS

The features and advantages of the image signal compressor according to the present invention over the prior-art compressor will be more clearly appreciated from the following description of the preferred embodiment of the invention taken in conjunction with the accompanying drawings in which like reference numerals designate the same or similar elements or sections throughout the figures thereof and in which.

DETAILED DESCRIPTION OF THE PREFERRED EMBODIMENTS

To facilitate understanding of the present invention, a reference will be made to a prior-art image signal compressor with reference to the attached drawings.

Figure 1:
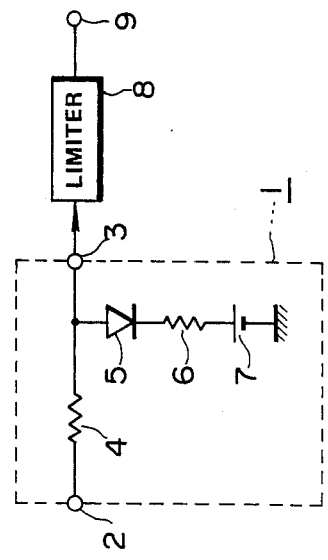
FIG. 1 is a circuit diagram of a prior-art image signal compressor.

FIG. 1 is a circuit diagram of an example of prior-art image signal compressors generally called "knee circuit". In the image signal compressor 1, there are provided an image signal input terminal 2 and an image signal output terminal 3. The compressor 1 is made up of a first resistor 4, a diode 5, a second resistor 6, and a DC voltage source 7 for applying a reference compression start potential. The first resistor 4 is connected between the image signal input and output terminals 2 and 3. The circuit leg including the diode 5, the second resistor 6 and the DC voltage source 7 all connected in series is connected between the image signal output terminal 3 and the ground. In addition, a limiter 8 is usually connected to the output terminal 3 of the compressor 1 in order to limit the voltage level of the compressed image signal derived from the compressor 1. The reference numeral 9 denotes an output terminal of the limiter 8.

Figure 2:
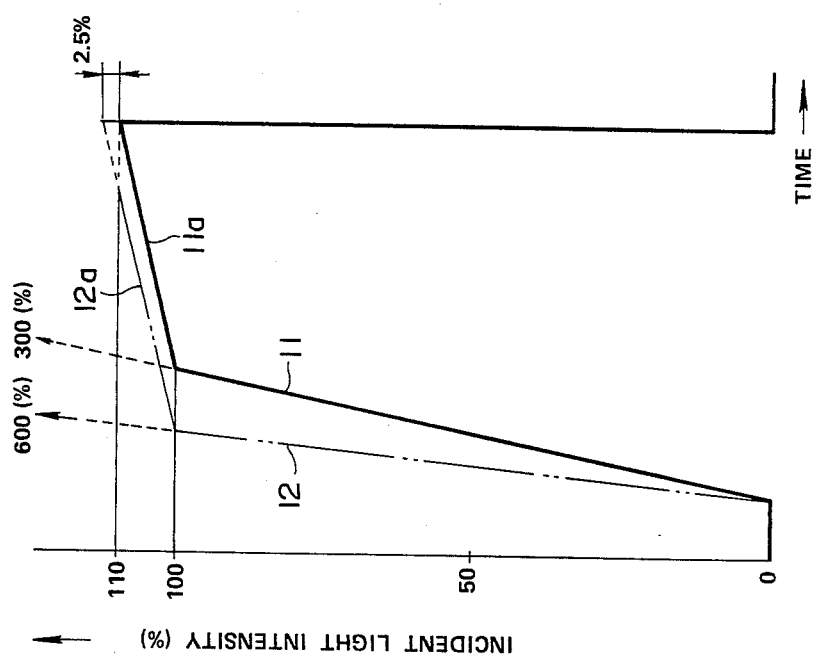
FIG. 2 is a graphical representation for assistance in explaining the operation of the prior-art image signal compressor shown in FIG. 1.

The operation of the prior-art image signal compressor 1 shown in FIG. 1 will be described hereinbelow with reference to FIG. 2, in which the voltage level of an image signal in excess of a predetermined level (100 percent) is compressed. In FIG. 2, the abscissa represents the time elapsed; the ordinate represents the intensity rate (percent) of light incident upon a monochrome image pickup tube. The intensity rate (percent) corresponds to the voltage level of an image signal to be compressed, because the voltage level of image signal transduced by an image pick-up tube is roughly proportional to the intensity of light incident upon the image pickup tube.

The assumption is made that the intensity rate (percent) of light incident upon an image tube varies according to the time elapsed in saw tooth waveform fashion. The image signal transduced by the image tube is supplied as a luminance signal to the image signal input terminal 2 of the compressor 1. In FIG. 2, the thick solid line 11 indicates the case where the luminance signal varies in saw tooth waveform fashion within a range from 0 to 300 percent; the dot-dot-dashed line 12 indicates the case where the luminance signal varies in saw tooth waveform fashion within a range from 0 to 600 percent, by way of example. Further, the first horizontal line (100 percent) drawn in parallel with the abscissa indicates the knee level at which the image signal (i.e. luminance signal) begins to be compressed in voltage level by the compressor 1; the second horizontal line (110 percent) drawn in parallel with the first line indicates the limiter level at which the image signal is limited in voltage level (the voltage level is clipped) by the limiter 8.

When the luminance signal changes within the range below the knee level of 100 percent, the positive luminance signal introduced into the compressor 1 is outputted through the first resistor 4 as it is without being subjected to voltage level compression, because the diode 5 is in a non-conductive state. However, once the luminance signal exceeds in voltage level the knee level (compression start level) of 100 percent, since the diode 3 is allowed to be conductive and therefore the voltage of the image signal is divided into two by the first and second resistors 4 and 6, the luminance signal outputted from the video signal output terminal 3 is compressed as depicted by the numeral 11a or 12a shown in FIG. 2.

The compression ratio is as follows:

$$\text{Ratio} = R_6/(R_4 + R_6)$$

where $R_4$ designates the resistance of the first resistor 4; $R_6$ designates the resistance of the second resistor 6; and the on-state resistance of the diode 5 and the internal resistance of the DC voltage source 7 are both neglected.

In FIG. 2, the knee level is set to a luminance signal voltage level corresponding to the incident light intensity rate of 100 percent. However, the knee level is freely adjustable by changing the DC source voltage under consideration of the on-voltage of the diode 5. Here, the DC source voltage is called a reference compression-start voltage level or potential.

In the case where the incident light intensity which generates the luminance signal varies in saw tooth waveform fashion within the range from 0 to 300 percent as depicted by the solid line 11 in FIG. 2, the signal level in excess of the knee level of 100 percent is compressed within the range from 100 to 110 percent in the incident light intensity rate without being subject to the limitation of the limiter 8, as depicted by the solid line 11a in FIG. 2.

On the other hand, under these conditions, in the case where the incident light intensity varies in saw tooth waveform fashion within the range from 0 to 600 percent as depicted by the dot-dot-dashed line 12 in FIG. 2, the signal level in excess of the knee level of 100 percent is compressed within the range from 100 to 112.5 percent in the incident light intensity rate in parallel with the compression line 11a as depicted by the dot-dot-dashed line 12a in FIG. 2. Here, it should be noted that since the incident light intensity exceeds the limiter level of 110 percent, the luminance signal is limited or clipped by 2.5 percent through the limiter 8, as well understood by the dot-dot-dashed line 12a in FIG. 2.

Therefore, in the prior-art image signal compressor, the exists a problem in that when the intensity of light incident upon the image tube is excessively great, the image signal (luminance signal) is clipped, causing the clipped image signal to change an image from gray to white when regenerated on a cathode-ray tube or Braun tube.

In this connection, if the limiter level is increased more than 110 percent in incident light intensity rate, although it is possible to prevent the image signal from being clipped by the limiter 8, it is impossible to effectively increase the compression ratio of the compressor 1 within a narrow range.

Figure 3:
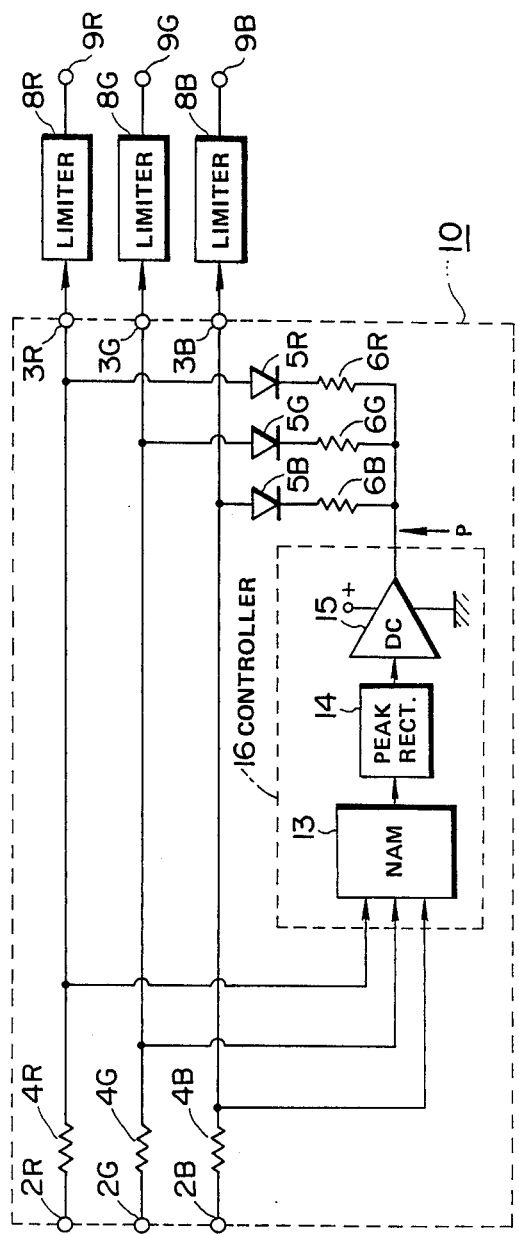
FIG. 3 is a circuit diagram of an embodiment of the image signal compressor according to the present invention.
Figure 4:
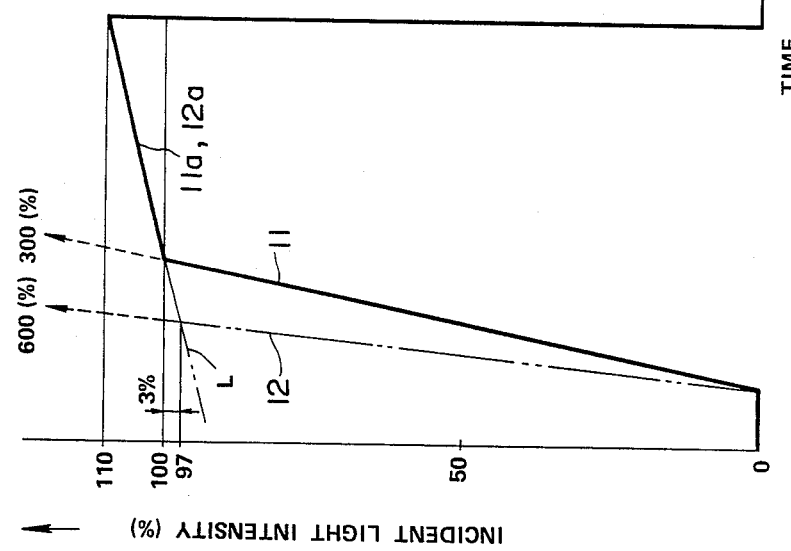
FIG. 4 is a graphical representation for assistance in explaining the operation of the image signal compressor according to the present invention shown in FIG. 3.

In view of the above description, reference is now made to an embodiment of the image signal compressor according to the present invention with reference to FIGS. 3 and 4. The feature of the present invention is to appropriately control the knee level according to the magnitude of the signal to be compressed so that the compressed signal can be derived from the compressor, without being clipped through the limiter, irrespective of the peak voltage value of the signal to be compressed. In more detail, the knee level is controlled so as to be decreased with increasing peak voltage level of the image signal to be compressed or vice versa.

FIG. 3 is a circuit diagram of an example of the image signal compressor according to the present invention applied to a single electron gun or a three electron gun color image pickup tube or solid-state color image pickup elements. In the image signal compressor 10, there are provided three (red, green and blue) image signal input terminals 2R, 2G and 2B and three (red, green and blue) image signal output terminals 3R, 3G and 3B. The compressor 10 is made up of three first resistors 4R, 4G and 4B, three diodes 5R, 5G, and 5B, three second resistors 6R, 6G and 6B, and a controller 16. Each of three first resistors 4R, 4G and 4B is connected respectively between each of the three input terminals 2R, 2G and 2B and each of the three output terminals 3R, 3G and 3B. Three circuit legs including each of the three diodes 5R, 5G and 5B and each of the three second resistors 6R, 6G and 6B in series are connected between each of the output terminals 3R, 3G and 3B and an output of the controller 16. In addition, three limiters 8R, 8G and 8B are connected separately to each of the compressor output terminals 3R, 3G and 3B in order to limit the voltage level of the image signal derived from the compressor 10. The reference numerals 9R, 9G and 9B denote independently each output terminal of each limiter 8R, 8G and 8B.

The controller 16 comprises a non-adder mixer 13, a peak rectifier 14 and an DC amplifier 15. The non-adder mixer 13 receives three chrominance (red, green and blue) signals through the three input terminals 2R, 2G and 2B and selects one chrominance signal having the highest peak voltage level from among the three chrominance signals. The selected highest-peak chrominance signal is then rectified through the peak rectifier 14 to obtain a DC signal the level of which is roughly proportional to the peak value of the selected highest-level chrominance signal. The rectified DC signal is amplified through the DC amplifier of operational amplifier type at an appropriate amplification ratio. Further, although not shown definitely in FIG. 3, the DC amplifier 15 functions in such a way that the positive potential at the output stage of the amplifier 15 decreases as the rectified peak voltage value of the chrominance signal increases. This positive potential is applied to the point P, that is, each cathode of the three diodes 5R, 5G and 5B as a variable compression start potential. Therefore, the higher the peak voltage level of one of the chrominance signals, the lower the knee level (compression start voltage level).

The operation of the image signal compressor 10 according to the present invention shown in FIG. 3 will be described hereinbelow with reference to FIG. 4. In the same manner as in FIG. 2, the thick solid line 11 corresponds to a chrominance signal of saw tooth waveform obtained by transducing light the intensity of which varies between 0 to 300 percent; the dot-dot dashed line 12 corresponds to a chrominance signal of saw tooth waveform obtained by transducing light the intensity of which varies between 0 to 600 percent. Further, the first horizontal line (100 percent) indicates a highest knee level; the second horizontal line (110 percent) indicates the limiter level.

When the chrominance signal changes within the range below the highest knee level of 100 percent, since the positive reference potential at point P is sufficiently high, the three diodes 5R, 5G, 5B are not conductive. Therefore, the chrominance signals are all outputted through the compressor 10 as they are without being subject to voltage level compression. However, if any one of the three chrominance (red, green, blue) signals increases in voltage level, the highest peak voltage level is selected by the non-adder mixer 13, rectified by the peak rectifier 14 and amplified by the dc amplifier 15. The potential at the point P is decreased, allowing the three diodes 5R, 5G, and 5B to be conductive. As a result, the three chrominance signals are compressed as depicted by the numeral 11a in FIG. 4. The compression ratio is roughly $R_6/(R_4+R_6)$ if the resistance in the DC amplifier 15 is neglected (where $R_4$ designates the resistance of the first resistor 4R, 4G or 4B; $R_6$ designates the resistance of the second resistor 6R, 6G or 6B).

In the case where the incident light intensity which generates the chrominance signal varies in saw tooth fashion within the range from 0 to 300 percent as depicted by the solid line 11 in FIG. 4, the signal level in excess of the knee level of 100 percent is compressed within the compression range of 100 to 110 percent in the incident light intensity rate without limitation through the limiter 8 as depicted by the solid line 11a in FIG. 4.

However, in the case where the incident light intensity varies in saw tooth waveform fashion within the range from 0 to 600 percent as depicted by the dot-dot dashed line 12 as shown in FIG. 4, the signal level in excess of the knee level of 97 percent, for instance, is compressed. This is because the peak voltage value of the chrominance signal (600 percent) is higher than that of the signal (300 percent) and therefore the rectified signal in the controller 16 allows the compression start potential at point P to decrease to a lower knee level (e.g. 97 percent). Therefore, the chrominance signal is compressed prior to the highest knee level of 100 percent. Once compressed, the chrominance signal is compressed along the line L at the same compression ratio $(R_6/(R_4+R_6))$ in parallel with the compression line 11a.

Here, in order to effectively compress the signal without limitation, it is preferable to lower the knee level so that the compression line 12a overlaps with the compression line 11a. In order to overlap the compression line one another, the knee level (compression-start level) is determined in such a way that: (1) the highest knee level (100 percent in FIG. 4) is first determined to compress the chrominance signal; (2) the limitation level (110 percent) is determined; (3) the compression ratio is determined so that the compression line L lies between the highest knee level and the limitation line; (4) the other knee level (97 percent) is determined at the point where the chrominance signal voltage level 12 intersects the compression line L.

However, without being limited to the straight compression line L as depicted in FIG. 4, it is also possible to determine the knee level along a curved line or a quadratic curve having a negative coefficient (convex upwardly).

The embodiment has been explained of the case where the image signal compressor according to the present invention is applied to the color image pickup tube. However, without being limited to this, it is also possible to apply the image signal compressor according to the present invention to a monochrome image pickup tube or monochrome solid-state image pickup elements.

As described above, in the image signal compressor according to the present invention, since a controller is incorporated in the compressor so as to decrease the knee level with increasing peak voltage value of chrominance signals to be compressed, it is possible to effectively compress the image signal, irrespective of the magnitude of the chrominance signals, without being subject to limitation of the limiter provided at the next stage of the compressor, thus preventing the image (chrominance) signal from being regenerated in white on a cathode-ray tube.

It will be understood by those skilled in the art that the foregoing description is in terms of a preferred embodiment of the present invention wherein various changes and modifications may be made without departing from the spirit and scope of the invention, as set forth in the appended claims.

What is claimed is:

1. A signal compressor, which comprises:
   (a) a first resistor, a signal to be compressed being applied to one end thereof;
   (b) a diode connected to said first resistor, a compressed signal being derived from a junction point between said first resistor and said diode;
   (c) a second resistor connected in series with said diode; and
   (d) control means responsive to the signal to be compressed and to said compressed signal, said control means connected to said second resistor for controlling a compression start potential at which said diode is allowed to be conductive in such a way as to decrease the compression start potential with increasing peak voltage level of the signal to be compressed, when said diode is conductive, the signal to be compressed being compressed at a compression ration determined by said first and second resistors, said diode being poled so that diode is conductive whenever the signal to be compressed is greater than said compression start potential, said control means including means responsive to said peak voltage level of said signal to be compressed for establishing said compression start potential at a level which makes the compressed signal corresponding to said peak voltage level equal to a predetermined level, wherein said signal compressor does not compress levels of signal to be compressed which are less than said compression start potential, and wherein said predetermined level is approximately 10% greater than the highest level of the signal to be compressed which is not compressed by said signal compressor.

2. An image signal processor, comprising, in combination;
 (a) three first resistors, means for applying a respective one of three chrominance signals to be compressed to one end of each of said first resistors,
 (b) three diodes respectively connected to said first three resistors, three compressed chrominance signals being derived from the respective junction points between said first resistors and said three diodes,
 (c) three second resistors respectively connected in series with said three diodes; and
 (d) control means responsive to each of the three chrominance signals to be compressed and connected to said three second resistors for controlling the compression start potential at which said three diodes are allowed to be conductive in such a way as to decrease said compression start potential with increasing highest peak voltage level of the three chrominance signals to be compressed or increase said compression start potential with decreasing highest peak voltage level of the three chrominance signals to be compressed, when said three diodes are conductive, the three chrominance signals to be compressed being compressed at respective compression ratios determined by said three first resistors and said three second resistors.

3. A signal compressor, which comprises:
 (a) three first resistors, three chrominance signals to be compressed being applied to respective ends thereof;
 (b) three diodes respectively connected to said three first resistors, compressed signals being derived from junction points between said first resistors and said diodes;
 (c) three resistors respectively connected in series with said diodes;
 (d) a non-adder mixer responsive to said three chrominance signals to be compressed for producing a signal corresponding to highest peak levels of said chrominance signals to be compressed;
 (e) a peak rectifier for rectifying the produced signal; and
 (f) a dc amplifier connected between said peak rectifier and said three second resistors for decreasing a compression start potential for each of said three compression ratios in response to an increase in the produce signal.

4. An image signal compressor, which comprises:
 (a) a respective one of three first resistors, means for applying three chrominance signals to be compressed to one end of each said first resistors;
 (b) three diodes respectively connected to said three first resistors, three compressed chrominance signals being derived from respective junction points between said first resistors and said three diodes;
 (c) three second resistors respectively connected in series with said three diodes; and
 (d) control means responsive to each of the three chrominance signals to be compressed and connected to said three second resistors for controlling the compression start potential at which said three diodes are allowed to be conductive in such a way as to decrease said compression start potential with increasing highest peak voltage level of the three chrominance signals to be compressed or increase said compression start potential with decreasing highest peak voltage level of the three chrominance signals to be compressed, when said three diodes are conductive, the three chrominance signals to be compressed being compressed at respective compression ratios determined by said three first resistors and said three second resistors, said control means having a plurality of inputs, connected respectively to said junction points, whereby said control means is responsive to the chrominance signals to be compressed and the compressed chrominance signals.

5. An image signal compressor which comprises:
 (a) three first resistors, means for applying a respective one of three chrominance signals to be compressed to one end of each of said first resistors;
 (b) three diodes respectively connected to said three first resistors, three compressed chrominance signals being derived from respective junction points between said first resistors and said three diodes;
 (c) three second resistors respectively connected in series with said three diodes;
 (d) control means responsive to each of the three chrominance signals to be compressed and connected to said three second resistors for controlling the compression start potential at which said three diodes are allowed to be conductive in such a way as to decrease said compression start potential with increasing highest peak voltage level of the three chrominance signals to be compressed or increase said compression start potential with decreasing highest peak voltage level of the three chrominance signals to be compressed, when said three diodes are conductive, the three chrominance signals to be compressed being compressed at respective compression ratios determined by said three first resistors and said three second resistors, each of said diodes being poled to be conductive when the respective chrominance signal to be compressed exceeds said compression start potential.

6. The signal compressor according to claim 5, wherein said control means includes means responsive to the highest peak value of any said three chrominance signals to be compressed, and for establishing said compression start potential at a level which makes the peak voltage level of at least one of the compressed signals equal to as predetermined level.

7. The signal compressor according to claim 5, wherein said control means includes means for establishing said compression start potential, for different highest peak voltage levels of the chrominance signals to be compressed, such that the corresponding peak voltage level is of at least one of the compressed signals equal to a predetermined level.

8. The single compressor according to claim 5, wherein said control means has an output characteristic, relative to the level of at least one of said chrominance signals to be compressed, with a first leg rising to said compression start potential, and a second leg rising from a compression start potential to said predetermined level.

9. A single compressor, which comprises:
(a) a first resistor, a signal to be compressed being applied to one and thereof;
(b) a diode connected to said first resistor, a compressed signal being derived from a junction point between said first resistor and said diode;
(c) a second resistor connected in series with said diode; and
(d) control means responsive to the signal to be compressed and to said compressed signal, said control means connected to said second resistor for controlling a compression start potential at which said diode is allowed to be conductive in such a way as to decrease the compression start potential with increasing peak voltage level of the signal to be compressed, when said diode is conductive, the signal to be compressed being compressed at a compression ratio determined by said first and second resistors, said control means comprising
(e) a peak rectifier responsive to the signal to be compressed for rectifying a received peak voltage level of the signal; and
(f) a dc amplifier connected between said peak rectifier and said second resistor for decreasing the compression start potential with increasing rectified peak voltage level of the received signal, said control means including means responsive to said peak voltage level of said signal to be compressed establishing said compression start potential at a level which makes the corresponding peak voltage level of the compressed signal equal to a predetermined level, and said control means including means for establishing different compression start potentials for different peak values of the signal to be compressed, such that the compressed value of each of said peak values of equal to said predetermined level.

10. A signal compressor, which comprises:
(a) a first resistor, a signal to be compressed being applied to one end thereof;
(b) a diode connected to said first resistor, a compressed signal being derived from a junction point between said first resistor and said diode;
(c) a second resistor connected in series with said diode; and
(d) control means responsive to the signal to be compressed and to said compressed signal, said control means connected to said second resistor for controlling a compression start potential at which said diode is allowed to be conductive in such a way as to decrease the compression start potential with increasing peak voltage level of the signal to be compressed or, when said diode is conductive, the signal to be compressed being compressed at a compression ratio determined by said first and second resistors, said control means comprising
(e) a peak rectifier responsive to the signal to be compressed for rectifying a received peak voltage level of the signal; and
(f) a dc amplifier connected between said peak rectifier and said second resistor for decreasing the compression start potential with increasing rectified peak voltage level of the received signal, said control means including means responsive to said peak voltage level of said signal to be compressed for establishing said compression start potential at a level which makes the corresponding compressed signal equal to a predetermined level, said signal compressor having an output characteristic, relative to the level of said signal to be compressed, with a first leg rising to said compression start potential, and a second leg rising from said compression start potential to said predetermined level.

* * * * *